US008395872B2

(12) United States Patent
Turpin et al.

(10) Patent No.: US 8,395,872 B2

(45) **Date of Patent: *Mar. 12, 2013**

(54) CURRENT DRIVER CIRCUIT AND METHOD OF OPERATION THEREFOR

(75) Inventors: Pierre Turpin, Toulouse (FR); Laurent Guillot, Seysses (FR)

(73) Assignee: Freescale Semiconductor, Inc., Austin, TX (US)

( * ) Notice: Subject to any disclaimer, the term of this patent is extended or adjusted under 35 U.S.C. 154(b) by 1139 days.

This patent is subject to a terminal disclaimer.

(21) Appl. No.: 11/911,807

(22) PCT Filed: Apr. 18, 2005

(86) PCT No.: PCT/EP2005/005212

§ 371 (c)(1), (2), (4) Date: Oct. 17, 2007

(87) PCT Pub. No.: WO2006/111188

PCT Pub. Date: Oct. 26, 2006

(65) Prior Publication Data

US 2008/0204957 A1 Aug. 28, 2008

(51) Int. Cl.
*H02H 9/08* (2006.01)

(52) U.S. Cl. ........................................................ 361/93.9

(58) Field of Classification Search .................. 361/93.9; 315/224, 247

See application file for complete search history.

(56) References Cited

U.S. PATENT DOCUMENTS 3,678,268 A * 7/1972 Reim et al. ...................... 378/54
3,747,063 A * 7/1973 Hudson, Jr. ................... 315/323
4,851,953 A 7/1989 O'Neill et al.
4,967,304 A 10/1990 Dougherty
5,068,570 A * 11/1991 Oda et al. ...................... 315/128
5,512,883 A 4/1996 Lane, Jr.
5,777,894 A * 7/1998 Settles et al. .................. 700/295
5,821,703 A 10/1998 Callahan et al.
5,909,181 A * 6/1999 Golzmane ..................... 340/649
6,078,158 A * 6/2000 Heeren et al. ................. 318/430
6,414,860 B1 7/2002 Li
6,531,830 B2 * 3/2003 Akimoto et al. .............. 315/224
7,358,683 B2 * 4/2008 LaGrave et al. .............. 315/247
7,855,517 B2 12/2010 Turpin et al.
2003/0057305 A1 * 3/2003 Watano et al. .................. 241/36
2003/0095368 A1 5/2003 Daniels et al.

(Continued)

FOREIGN PATENT DOCUMENTS

EP 0340762 A2 11/1989
EP 0659307 5/1996

(Continued)

*Primary Examiner* — Rexford Barnie
*Assistant Examiner* — Angela Brooks

(57) ABSTRACT

A current driver circuit comprises circuitry having a current adjustment function and operably coupled to a current driver for providing a current to a current consuming device. The circuitry comprises or is operably coupled to a function arranged to determine a current level being drawn by the current consuming device. The current adjustment function varies an over-load limit applied to the current driver in response to a variation in the determined current level.

In this manner, the current level being drawn by a current consuming device, such as a light bulb, is used to continuously or intermittently adjusting the current limit of a current driver circuit, such as a lamp driver, to minimize the energy dissipated in case of an overload condition.

20 Claims, 4 Drawing Sheets

U.S. PATENT DOCUMENTS

2003/0156374 A1 8/2003 Edwards et al.
2004/0125245 A1* 7/2004 Choi .................................. 349/1
2006/0049780 A1 3/2006 Hsieh
2006/0158125 A1* 7/2006 Pollmann-Retsch et al. . 315/106
2009/0040674 A1* 2/2009 Roberts et al. .................. 361/78

FOREIGN PATENT DOCUMENTS

GB 2230664 A 10/1990
WO 9925049 A1 5/1999

* cited by examiner

CURRENT DRIVER CIRCUIT AND METHOD OF OPERATION THEREFOR

FIELD OF THE INVENTION

The preferred embodiment of the present invention relates to current drivers suitable for use as lamp drivers. The invention is applicable to, but not limited to, current drivers required to support high (inrush) current to a light bulb at a point of 'turn-ON'.

BACKGROUND OF THE INVENTION

In the field of semiconductor devices, there has been an increasing interest in the development of more intelligence based within the device, often referred to as 'smart' devices. The terminology used for 'smart' devices encompasses the association of analogue and digital circuitry with precise diagnosis. It is also generally desired to implement more intelligent features in the provision of smart high-power devices, in order to improve reliability and longevity of the device, which is known as problematic due to the increased stresses applicable with high power operation. One such smart high-power device is a lamp driver. In the context of the present invention, the term 'lamp driver' encompasses a driver circuit for filament lamps.

All known lamp driver integrated circuits (ICs), such as an MC33892 switch from Freescale™, etc. require the ability to support a high current upon switch 'ON' of the lamp. In this regard, and referring first to FIG. 1, a known process of a bulb heating up and cooling down is illustrated graphically 100. The graph 100 illustrates how a bulb current (in Amps (A)) 105 varies 115 versus time (in msec) 110. The bulb is initially illustrated as being turned 'ON', where the 'turn-On' current reaches a peak current of approximately 17 A. The bulb is left in an 'ON' state for approximately 100 msec's 120, during which time the current requirements drop to a dc current value of around 2 A, and then the bulb is turned 'OFF' 130. Notably, if the bulb is then turned 'ON' again 125, after say an 'OFF' period of 300 msec's, the bulb only draws 4 A.

However, the inventors of the present invention have recognised that even though the 'bulb' current drops from, say 17 A to 2 A in around 50 msec., a standard lamp driver requires a high current of (maximum) 45 A upon turn 'ON', which is maintained for say a maximum period of 80 msec. when it is stepped down to, say 5 A. This lamp driver current requirement 215 is illustrated graphically 200 in FIG. 2.

Similarly, if the bulb is turned 'OFF', the current limitation is reset and will be kept at a high level of 45 A again until the next turn 'ON' operation. Such high currents are very undesirable and significantly shorten the average life span of the lamp driver device.

It is known that some applications may employ pulse width modulation (PWM), where the cyclical current requirements may be set through a serial port interface (SPI). Employing a PWM mode of operation facilitates a significant reduction in the average current requirements of a lamp driver circuit. Here, PWM may be employed at a rate, say, of typically 200 Hz, and applied after the initial 45 A inrush current.

However, in implementing a PWM scheme, a digital circuit is required and configured to control the lamp driver in a real time manner. In this regard, the digital circuit provides control signals to the lamp driver, say 80 msec after the start of PWM period. Alternatively, the lamp driver needs to be configured to perform the PWM operation, which adds to the complexity.

Notably, such circuits cannot be employed with low PWM rates, such as a PWM at around '1' Hz that would be suitable for flasher application or for reliability testing with cyclic short circuits, again at around 1 Hz.

The inventors have recognised and appreciated a further problem with lamp driver ICs, in that they are prone to cyclical short circuits, for example a permanent or erratic short circuit with repetitive turn-'ON'. In this regard, the lamp driver circuit has no 'memory' of a previous PWM cycle, i.e. the current limit is reset at every turn 'OFF'. Hence, known lamp driver circuits assume that the bulb is always cold (i.e. the motor has stopped or an inductance has been charged), and consequently they draw 45 A as a prerequisite upon switch 'ON'.

In known lamp driver applications, it is also known that the current limit of a lamp driver power stage comprises two levels, one for the peak current and one for the dc level. Furthermore, this current limit is set to support the worst case current loads required by the lamp. Also, the current limit imposed on the driver current needs to be able to support an inrush current at each turn 'ON' of the lamp.

Furthermore, in a case of a 'true' short circuit, the device will potentially drive a high amount of current into the lamp at each turn 'ON'. This situation creates high levels of stress in the IC package, thereby reducing the lifetime of the device.

Thus, there exists a need for improved protection during an 'ON' phase of the current driver, such as one suitable as a lamp driver and bulb arrangement, and method of operation therefor.

STATEMENT OF INVENTION

In accordance with aspects of the present invention, there is provided a current driver circuit, such as a lamp driver and bulb arrangement, and method of operation therefor, as defined in the appended Claims.

Figure 3:
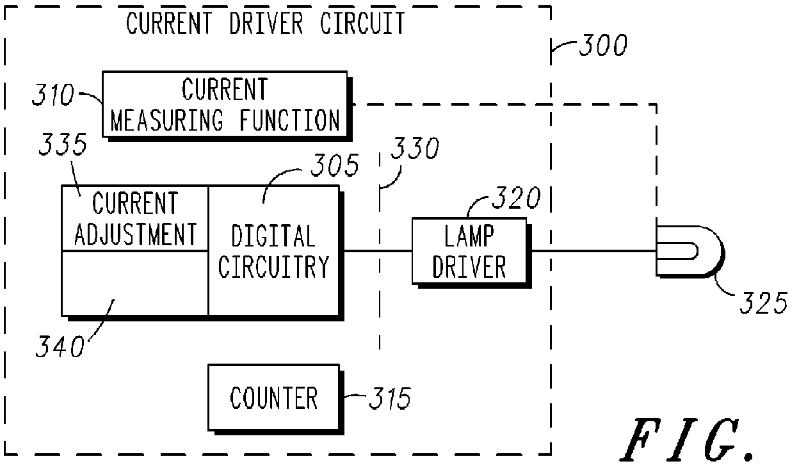
Figure 4:
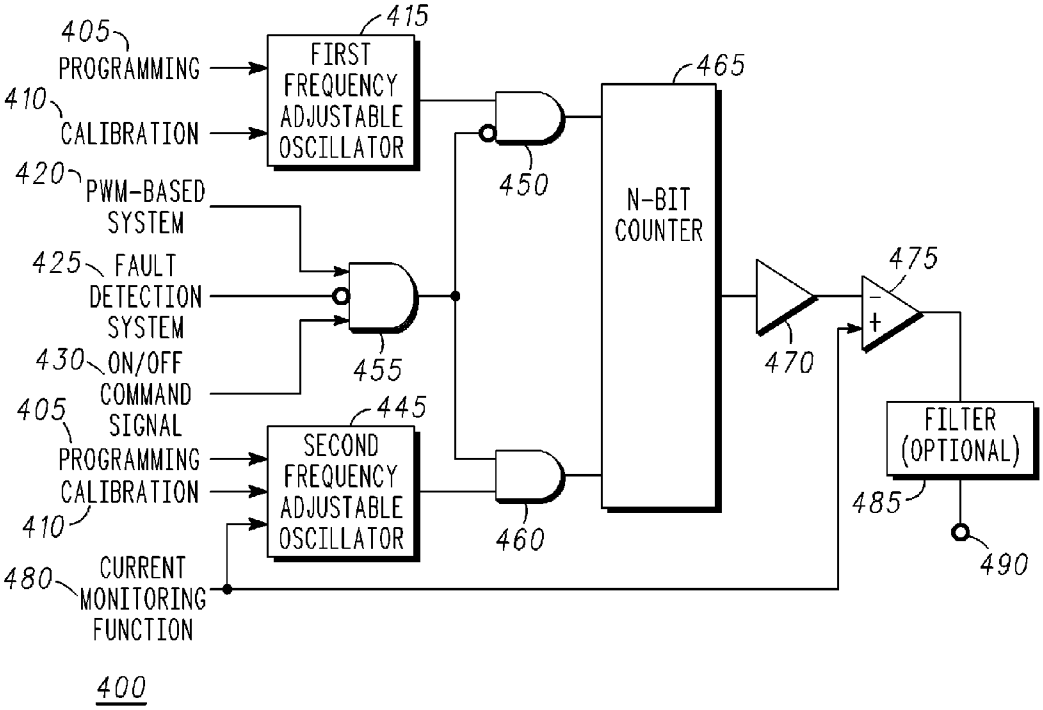
Figure 5:
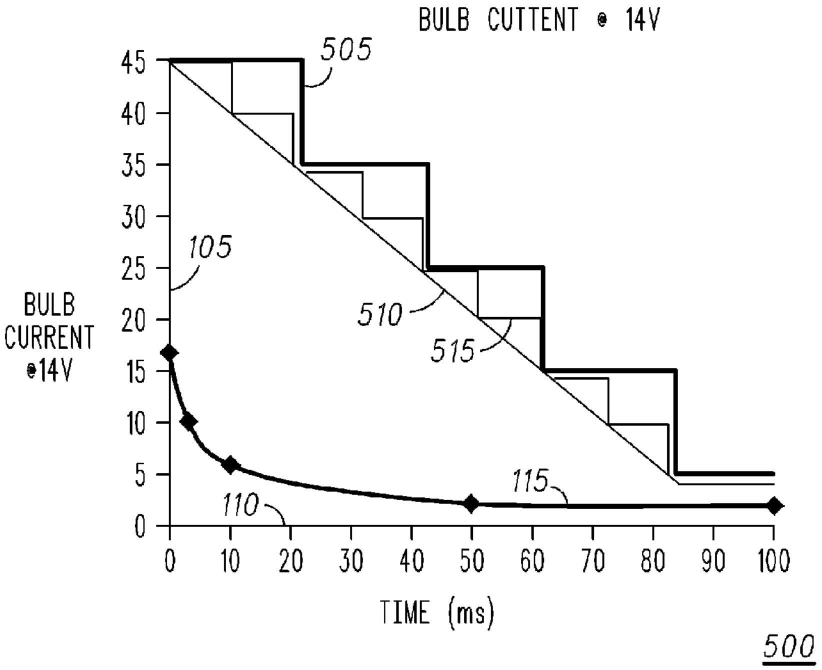
Figure 6:
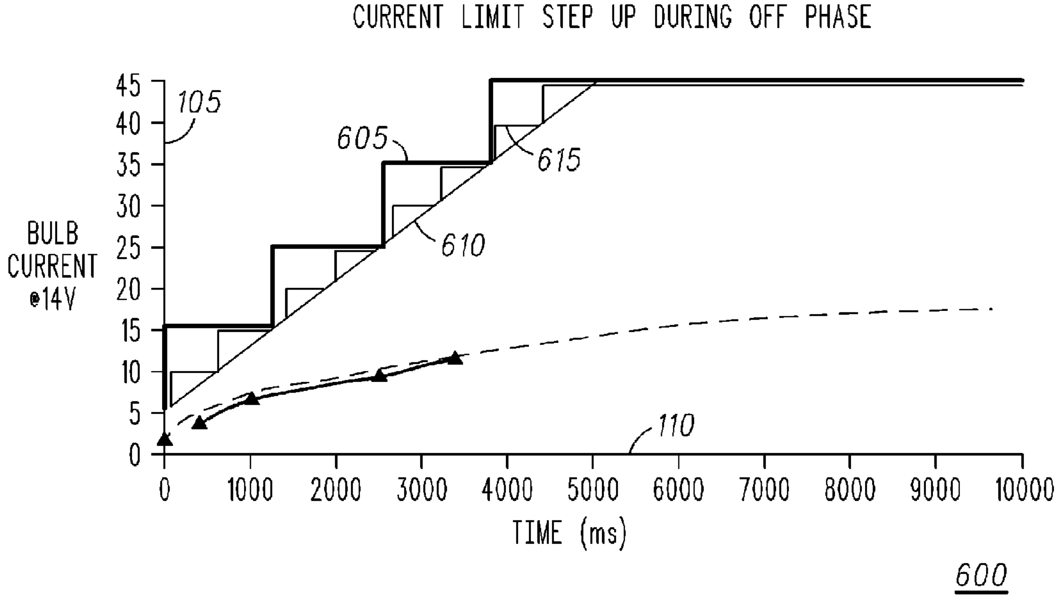
Figure 7:
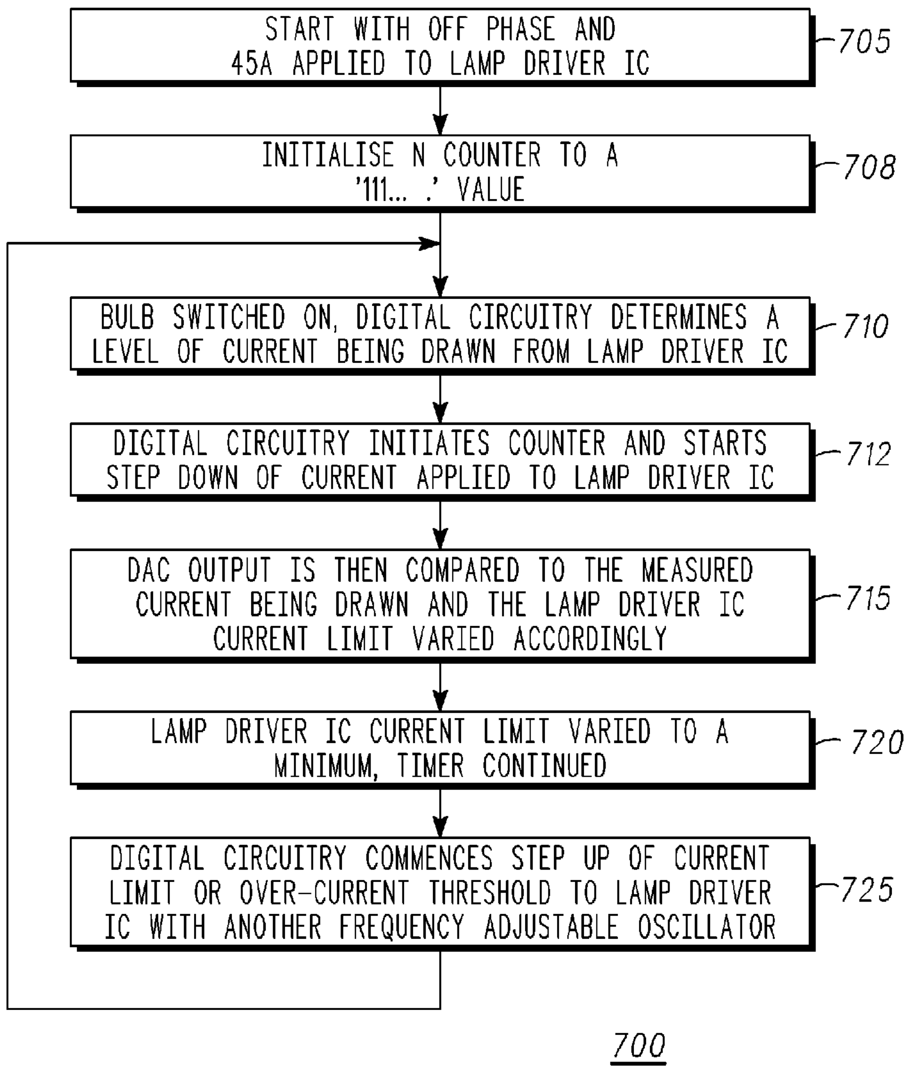

Exemplary embodiments of the present invention will now be described, by way of example only, with reference to the accompanying drawings, in which:

FIG. 3 illustrates a lamp driver and bulb arrangement, adapted in accordance with the preferred embodiment of the present invention;

FIG. 4 illustrates a more detailed lamp driver and bulb arrangement, adapted in accordance with the preferred embodiment of the present invention;

FIG. 5 and FIG. 6 illustrate graphically an operation of a lamp driver circuit and bulb, with regard to current requirements over time, in accordance with the preferred embodiment of the present invention; and FIG. 7 illustrates a method of operation of a lamp driver circuit and bulb, adapted in accordance with the preferred embodiment of the present invention.

DESCRIPTION OF PREFERRED EMBODIMENTS

The preferred embodiment of the present invention will be described in terms of a lamp driver and bulb arrangement. However, it will be appreciated by a skilled artisan that the inventive concept herein described may be embodied in any type of current driver employing a current limit where the normal load current is varying with time. In a number of applications, the adaptation of a driver circuit in accordance with the preferred embodiment of the present invention effectively performs a function of a fuse, in that it limits an average current being supplied to a current consuming device. In this manner, as the improved driver circuit emulates an operation of a fuse, there is no need for the circuit to comprise a fuse or associated wire connecting to/from the fuse, which is a simple, destructive and unintelligent protection mechanism.

Furthermore, it is envisaged that the inventive concept is not limited to use in high-current applications. It is envisaged that the inventive concept herein described may equally be applied to low power device applications, for example where an IC drives a small bulb, of say 1 W, using a small motor or coil driver.

In summary, the inventors of the present invention have both recognised and appreciated that, in practice, the required 'inrush' current to support a lamp driver and bulb arrangement is dependent upon whether the bulb that is being driven is 'cold' or 'hot', e.g. a temperature state of the bulb. Hence, a mechanism for adjusting the current limitation depending upon whether the lamp is, or has recently been, in an 'ON' or 'OFF' phase is described.

The preferred embodiment of the present invention aims to measure the current being drawn by the lamp driver IC, to reflect the temperature change of the bulb's filament as it heats up or cools down.

Referring now to FIG. 3, a current driver circuit 300 and bulb 325 arrangement is illustrated that has been adapted in accordance with the preferred embodiment of the present invention. The current driver circuit 300 and bulb 325 arrangement comprises a lamp driver circuit 300 having a digital circuit 305 operably coupled to a lamp driver IC 320, which in turn is operably coupled to, and drives a current to, a light bulb 325. The digital circuit, in the preferred embodiment of the present invention, may comprise any digital circuitry, for example any circuitry from a few digital logic gates up to a microcontroller-based arrangement.

The digital circuitry 305 is also operably coupled to a counter 315 and a current measuring function 310. The current measuring function is also operably coupled to the light bulb 325 for determining an current being drawn by the bulb 325 when in an 'ON' phase.

It is within the contemplation of the present invention that one or more of the functional blocks in FIG. 3 (apart from the bulb 325) may be located either within, or operably coupled to, the current driver circuit 300, dependent upon design choice and/or the application.

In accordance with the preferred embodiment of the present invention, the current being drawn by the current consumption device, such as the light bulb 325, as seen by the current driver, is measured. The value of current being drawn is be used to adjust (increase or decrease) the rate of the slope being used to adapt the current limit value during an 'ON' phase.

Thus, it is envisaged that the particular time constant (slope) may be adjusted dependent upon the current actually flowing into the lamp driver IC, as illustrated in the graphs of FIG. 5 and FIG. 6. Thus, instead of applying a constant decreasing slope to decrease the current limit applied during an 'ON' phase, a variable rate decreasing slope may be used. The digital circuitry 305 then adjusts accordingly a current limit applied to the lamp driver IC 320.

When the lamp driver IC 320 is 'ON', the digital circuitry 305 controls the lamp driver IC 320 to apply a current to the light bulb 325 that heats up the bulb filament with a certain time constant. For example, after approximately 50 msec it may be assumed that the bulb filament is hot. During an 'OFF' phase, the bulb filament cools down according to another time constant, for example after approximately 10 seconds the bulb filament is cool.

Thus, a current driver circuit 300, which in the preferred embodiment is a lamp driver IC, comprises a digital circuitry 305 having a current adjustment function 335. The current adjustment function 335 may be implemented using any known technique, as illustrated with respect to FIG. 4. The current adjustment function 335 is operably coupled to the current driver 320 for providing a current to a current consuming device, such as a light bulb 325.

In accordance with the preferred embodiment of the present invention, and in response to the measured current level being drawn by the current consuming device 325, the current adjustment function 335 varies a current limit applied to the current driver 320.

A skilled artisan will appreciate that in other applications, alternative functions/circuits/devices and/or other techniques may be used for monitoring current levels being drawn; a preferred example being illustrated below with respect to FIG. 4.

In accordance with the preferred embodiment of the present invention, the current limit is adapted by decreasing or increasing it with a certain time constant (i.e. slope), as described below with respect to the graphs illustrated in FIG. 5 and FIG. 6.

It is envisaged that the particular time constant (slope) applied to the lamp driver IC may depend on a predetermined characterisation of current being drawn, for example as monitored or measured during laboratory testing or manufacture.

It also envisaged that the particular time constant (slope) may be adjusted by the digital circuitry 305 via an SPI 330. In this manner, the particular time constant (slope) may be adjusted to fit different current threshold levels. A measured time elapse since a previous turn 'ON' or 'OFF' of the bulb filament is also preferably factored in, taking into account that it takes approximately 50 msec to heat the bulb from cold, and approximately '5' seconds for the bulb filament to cool down from hot.

In the preferred embodiment of the present invention, the digital counter 315 is used to track how long the lamp bulb has been in an 'ON' phase or an 'OFF' phase. In this manner, the digital circuitry 305, following receipt of timing updates from the digital counter 315, is configured to control/vary the current limit applied to the lamp driver IC 320 to reflect further temperature increases or decreases as the light bulb 325 heats up or cools down. For example, it is envisaged that the digital counter 315 is configured to 'step up' in a series of small current levels during an 'OFF' phase and 'step down' during an 'ON' phase.

Thus, in summary, the preferred embodiment of the present invention applies a current limit that follows the current being drawn by the current consumption device during an 'ON' phase over time. Notably, the variation of the current limit is applied over multiple 'ON'/'OFF' cycles.

During the 'ON' phase, the bulb filament is heating up and therefore the current limit is decreasing with a specific temperature coefficient. As an example, a 21 W/12V bulb will reach a DC current of 2 A after a maximum of 80 msec's. During the 'OFF' phase, the bulb filament is cooling down. The inrush current at the next turn 'ON' is increasing up to a nominal inrush current (when the bulb is cold).

A skilled artisan will appreciate that a second temperature coefficient will fit this temperature decrease rate. Thus, a first temperature co-efficient (or algorithm or time constant) is applied by the digital circuitry 305 during an 'ON' heating phase, and a second temperature co-efficient (or algorithm or time constant) is applied by the digital circuitry 305 during an 'OFF' cooling down phase.

Advantageously, if the lamp driver IC 320 is turned 'ON' again, after a short 'OFF' period (for example, of the order of less than one second), the current limit applied by the digital circuitry 305 will be configured to stay at a lower value. Advantageously, in this manner, the digital circuitry provides better protection to the system IC 320, for example in the case of any short circuit.

In an enhanced embodiment of the present invention, it is envisaged that the inventive concept can by applied with a pulse width modulation (PWM) scheme. In a PWM context, the current limit is regulated dependent upon the PWM ratio, i.e. current limit is adjusted dependent upon a PWM duty cycle. Notably, the current limits that are applied are at a much lower level than the nominal in-rush current. The PWM mode of operation applied to the lamp driver IC 320 is performed by the digital circuitry 305. In alternative embodiments, it is envisaged that the PWM mode of operation may be implemented internally within the lamp driver IC 320, when coupled to (or comprising), say, a clock/timing base and configured with a PWM ratio that can be pre-determined or varying.

It is also envisaged that this enhanced embodiment may be applied to a motor driver employing PWM, where a 'stopped' motor may be considered equivalent to a 'cold bulb' and a running motor may be considered equivalent to a 'hot bulb'.

Alternatively, it is envisaged that the temperature co-efficient rules may be set or adjusted in the laboratory or during manufacture. It is also envisaged that the temperature rules may be updated through continuous or intermittent monitoring of the current being drawn, as its performance varies, say, through ageing.

Furthermore, it is envisaged that a customer or user of the lamp driver IC, is provided with the means to adapt the temperature rules/timing constant (or slope) in response to any change in the levels of current being drawn. Thus, the performance of the lamp driver IC is configured as re-programmable.

Referring now to FIG. 4, a more detailed current driver circuit 400 is illustrated. Programming 405 and calibration 410 information is provided to a first frequency adjustable oscillator circuit 415, for adjusting the PWM frequency of operation during an 'OFF' phase. An output of the frequency adjustable oscillator circuit 415 is input to a first logic 'AND' gate 450.

If a PWM-based system 420 is employed, the PWM output signal is applied to a second logic 'AND' gate 455. A fault detection signal 425 is also inverted and applied to the second logic 'AND' gate 455. An 'ON'/'OFF' command signal 430 is also applied to the second logic 'AND' gate 455.

Programming 405 and calibration 410 information is also provided to a second frequency adjustable oscillator circuit 445, for adjusting the PWM frequency of operation during an 'ON' phase. An output of the second frequency adjustable oscillator circuit 445 is input to a third logic 'AND' gate 460.

The second logic 'AND' gate 455, has an output that is input to a first logic 'AND' gate 450 and inverted and input to the third logic 'AND' gate 460. Outputs from the first and third logic gates are input to an 'N'-bit counter 465. The first logic 'AND' gate 450 is used to increase the counter, up to '1111 . . . ', with the third logic 'AND' gate 460 used to decrease the counter down to '0000 . . . '.

Dependent upon whether the current consumption device is in an 'ON' or 'OFF' state, the 'N'-bit counter is increased or decreased, with a digital output signal consequently increased or decreased and input to a digital-to-analog converter (DAC) 470. At a high output, equating to an 'N'-bit converter output of '1111 . . . ', the output from the DAC 470 is equivalent to the peak-current limit. At a low output, equating to an 'N'-bit converter output of '0000 . . . ', the output from the DAC 470 is equivalent to the dc-current limit.

The output from the DAC 470 is a 'threshold' input to a comparator 475, which performs the detection of the load current (or voltage) and comparison of this threshold with the real-time value of load current (or voltage) provided by the current monitoring function 480. The current monitoring function 480, which may be configured to operate with load current or load voltage output signals, is also input to an input of the second frequency adjustable oscillator 445. In the context of the present invention, the current monitoring function 480 is, for example, a signal processor that measures the current in real-time and then provides a control signal to the frequency adjustable oscillator.

In the preferred embodiment of the present invention, the varying of the current limit encompasses varying the threshold level that is the output from the DAC 470. In effect, the 'current' limit equates to an overload limit relating to the current being drawn, which is varying. This overload limit is thus compared to the actual current being drawn measured in real-time. In this manner, if the output from the comparator is input to a processing function (not shown), a fault can be detected in function 425, which may then be used to adjust the current limit.

Advantageously, in accordance with the preferred embodiment of the present invention, the output from the current monitoring function 480 to the second frequency adjustable oscillator 445 is used to adjust (increase or decrease) the rate of the slope being used to adapt the current limit value during an 'ON' phase. Preferably, the adjustment of the slope (in FIG. 5 or FIG. 6) is made dependent upon the current being drawn. The adjustment of the slope is then applied to vary the output of the oscillator frequency.

In the preferred embodiment of the present invention, it is envisaged that the particular time constant (slope) is adjusted dependent upon the current actually flowing into the lamp driver IC, as illustrated in the graphs of FIG. 5 and FIG. 6.

The output of the comparator is input to an optional filter 485, which may be included to remove any glitches or parasitic interference in the comparator output signal, which is effectively a current adjusted signal 490 applied to the current consumption device.

Although the preferred embodiment of the present invention is described in terms of 'overload' current, it is envisaged that the inventive concept is equally applicable to overload voltage values.

In this manner, a determination of current being drawn by a current consuming device (such as a light bulb) is made and compared to a threshold value equivalent to a known previous 'current value'.

The circuitry illustrated in FIG. 4 is applicable for a digital system for, say a lamp driver or motor-based embodiment. It is envisaged that a similar circuit can be used for inductive (coil)-based arrangement, with some functions inverted (such as the configuration of the high-end and low-end counter values of the 'N'-bit counter, as would be appreciated by a skilled artisan).

It is also envisaged that the digital circuitry can be replaced by analogue circuitry and utilise the inventive concept hereinbefore described.

Referring now to FIG. 5, an operation of a lamp driver circuit and bulb is illustrated graphically 500, where the current limit is continuously stepped down over time during an 'ON' phase, in accordance with the preferred embodiment of the present invention. A time counter 510 is illustrated, with a corresponding current limit 515 that is stepped down in 5 A steps by, say, the digital circuitry 305 of FIG. 3.

Figure 1:
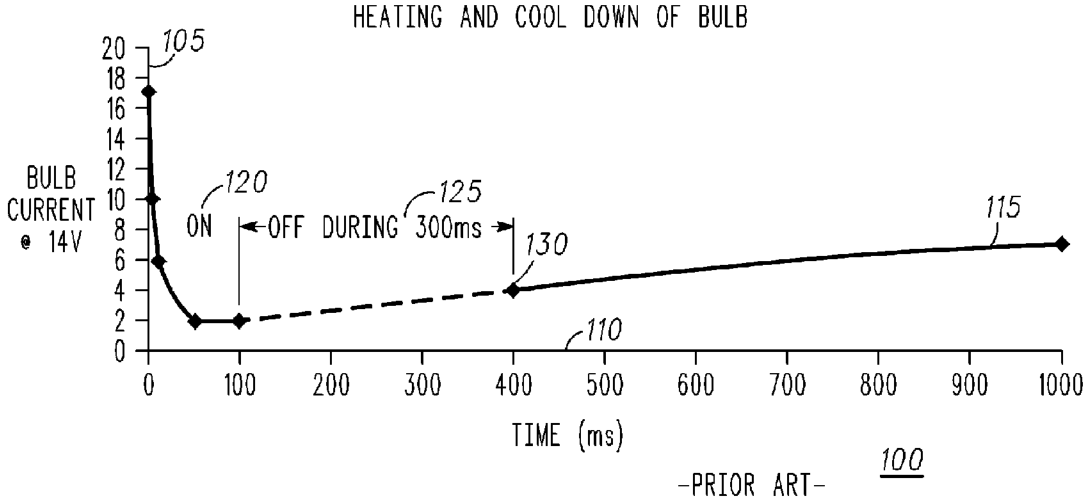
FIG. 1 and FIG. 2 illustrate graphically a known operation of a lamp driver circuit and bulb, with regard to current requirements over time.
Figure 2:
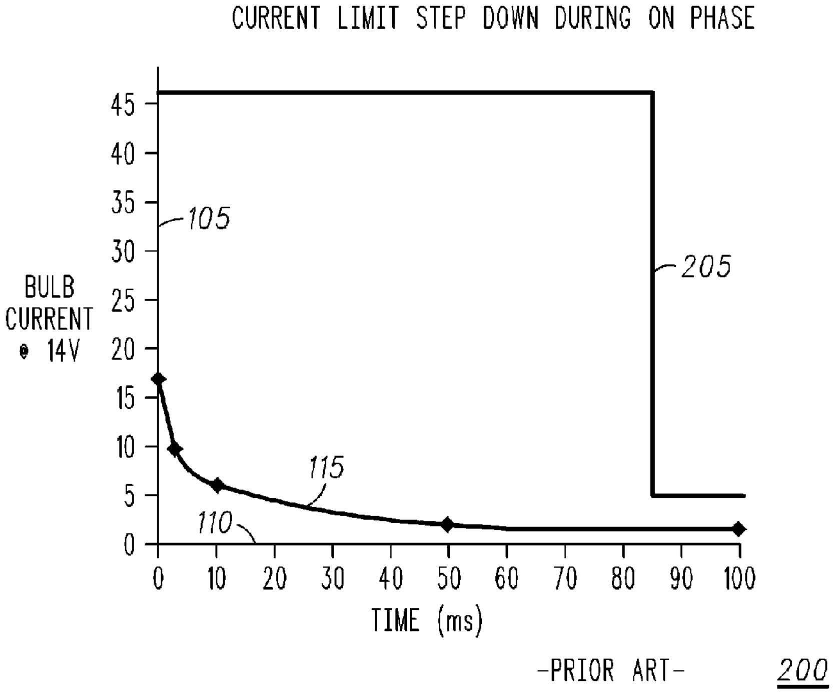

As clearly shown, when comparing the varying current limit approach described herein with the non-varying current limit approach illustrated in FIG. 2, a significant saving in current is achieved, thereby improving the protection and life span of the lamp driver IC.

Similarly, an alternative varying current limit approach is illustrated in graph 505. For example, this alternative varying current limit approach may be aligned to a PWM ratio of approximately 300 Hz, with a 10 A step down.

Referring now to FIG. 5, an operation of a lamp driver circuit and bulb is illustrated graphically 500, where the current limit is stepped down over time during an 'ON' phase, in accordance with the preferred embodiment of the present invention. As described above, a counter is incremented, with a corresponding current limit that is stepped down in 5 A steps 515 or stepped down in 10 A steps 505 by, say, the digital circuitry 305 of FIG. 3. Alternatively, the current limit is continuously adjusted 510.

Again, when comparing the varying current limit approach described herein with a comparable non-varying current limit approach, a significant saving in current is achieved, thereby improving the protection and longevity of the lamp driver IC.

Similarly, an alternative varying current limit approach is illustrated in graph 605 of FIG. 6. Referring now to FIG. 6, an operation of a lamp driver circuit and bulb is illustrated graphically 600, where the current limit is stepped up over time during an 'OFF' phase, in accordance with the preferred embodiment of the present invention. A counter operation 610 is illustrated, with a corresponding current limit 615 that is stepped up in 5 A steps or stepped up in 10 A steps 605 by, say, the digital circuitry 305 of FIG. 3. Alternatively, the current limit is continuously adjusted 610.

Again, when comparing the varying current limit approach described herein with a comparable non-varying current limit approach, a significant saving in current is achieved, thereby improving the protection and life span of the lamp driver IC.

Notably, with respect to FIG. 5 and FIG. 6, on entering an 'ON' or 'OFF' phase, the current adjustment commences from a particular current level and continues to increase or decrease until the current reaches a limit and the curve is horizontal. With respect to both the 'ON' and 'OFF' phase curves, the curves are arranged to be above the diagonal to ensure that the current driver is able to drive the current consuming device, especially in the case of high frequency PWM. For example, with a system that only has two or three bits, respectively high steps have to be made in order to drive the current consuming device. Thus, it is preferred to have a high number of bits to be used in implementing the DAC output.

For example, if a PWM rate of around 300 Hz is used, i.e. 3 KHz with a 10% accuracy and a period of five seconds to cool down the bulb, a fifteen bit DAC is required.

Referring now to FIG. 7, a flowchart 700 illustrates a preferred method of varying the current limit applied to a lamp driver IC. The method starts in an 'OFF' phase, with, say, a 45 A current being applied to the lamp driver IC by the digital circuitry, as shown in step 705. The N-counter is initialised to a value of, preferably, '111 . . . ', upon turn-'ON', as shown in step 708. A light bulb is switched 'ON' in step 710, in response to which the digital circuitry determines a level of current being drawn by the lamp driver IC. The determined current level is then applied to a logic gate with calibration data, and potentially a PWM scheme. The digital circuitry then initiates the counter and commences an algorithm to step down the current limit applied to the lamp driver IC, as shown in step 712, in response to a number of factors including, but not necessarily limited to, the determined current being drawn.

The DAC output is then compared to a measured current level and the lamp driver IC current limit varied accordingly, as shown in step 715. The lamp driver IC's current limit is consequently reduced to a minimum, via the counter outputting a series of values to a DAC, in step 720.

Subsequently, the bulb is switched 'OFF'. The digital circuitry commences an algorithm to step up the current limit or over-current threshold of the lamp driver IC with another frequency adjustable oscillator, as shown in step 725. The process then waits until the bulb is switched 'ON' again.

As mentioned, it is also envisaged that the inventive concept can be applied to a motor or a coil-based design. For a motor or coil-based design, the approach is inverted, in that the current limit is increasing during an 'ON' phase and decreasing during an 'OFF' phase. Here, current is typically carried by a re-circulation diode during the 'OFF' phase, whereas no current flows through the main current driver IC. Thus, there is no power dissipation in the main current driver IC and it is not prone to destruction.

Although the preferred embodiment of the present invention has been described with reference to low frequency signals, it is envisaged that, for alternative applications, the inventive concept may be applied to high frequency operation, such as applications operating in the MHz or GHz ranges.

It will be understood that the improved current driver circuit, such as a lamp driver and bulb arrangement, and method of operation therefor, as described above, aims to provide at least one or more of the following advantages:

(i) The circuit "knows" the current being drawn by the current consumption device during an 'ON' phase and is capable of continuously or intermittently adjusting the current limit to minimize the energy dissipated;

(ii) Inexpensive, if implemented with high integration technology;

(iii) The adapted current driver circuit performs a fuse emulator function, which limits energy entering the current driver and protects the wire between the lamp driver and bulb; and (iv) Reduces the potential energy dissipated during test with a cyclic short circuit, for example, a permanent or erratic short circuit with repetitive, turn-'ON', at a low or high frequency.

In particular, it is envisaged that the aforementioned inventive concept can be applied by a semiconductor manufacturer to any current driver, such as a lamp driver or motor driver or coil-based driver and bulb arrangement, for example those of the Freescale™ Switch family. Furthermore, the inventive concept can be applied to any circuits, for example where the digital area of the silicon is very small, such as the Smart metal oxide semiconductor (SMOS) SMOS8MV™ as manufactured by Freescale™ Semiconductor. It is further envisaged that, for example, a semiconductor manufacturer may employ the inventive concept in a design of a stand-alone device, such as a lamp driver integrated circuit, or application-specific integrated circuit (ASIC) and/or any other subsystem element.

Whilst the specific and preferred implementations of the embodiments of the present invention are described above, it is clear that one skilled in the art could readily apply variations and modifications of such inventive concepts.

Thus, an improved current driver arrangement, such as a lamp driver IC, and method of operation therefor have been described, wherein the aforementioned disadvantages with prior art arrangements have been substantially alleviated.

The invention claimed is:

1. A method of setting a current provided by a current driver circuit to a current consuming device, the method comprising:

determining a current level being drawn by the current consuming device during an 'ON' phase and an 'OFF' phase of the current consuming device;

varying a current limit applied to a current driver in response to determining the current level; and adjusting an output signal of the current driver based on a comparison of the current limit to a load signal, the load signal based on a load current or load voltage at the current consuming device.

2. A method according to claim 1 wherein determining a current level being drawn comprises determining a variation in current level being drawn over time.

3. A method according to claim 2, wherein the current driver is a lamp driver circuit for driving a light emitting current consuming device such as a light bulb.

4. A method according to claim 2, further comprising:

varying a rate of current limit or over-current threshold of the current consumption device in response to the step of determining the current being drawn.

5. A method according to claim 1 wherein the current driver is a lamp driver circuit for driving a light emitting current consuming device such as a light bulb.

6. A method according to claim 5, further comprising:

varying a rate of current limit or over-current threshold of the current consumption device in response to the step of determining the current being drawn.

7. A method according to claim 1, further comprising:

varying a rate of current limit or over-current threshold of the current consumption device in response to the step of determining the current being drawn.

8. A device comprising:

a module comprising an output operable to provide a first signal indicative of a load current or a load voltage associated with a current consuming device;

first circuitry comprising:

an input operable to receive a second signal indicative of a variation of a current being drawn by the current consuming device during an "ON" phase and an "OFF" phase of the current consuming device and an output operable to provide a over-load limit signal based on the second signal; and a comparator comprising a first input coupled to the output of the module, a second input coupled to the output of the first circuitry, and an output coupled to a current driver operable to provide a current to the current consuming device based on a comparison of the first load signal to the over-load limit signal.

9. The device of claim 8, further comprising second circuitry comprising an input to receive the first signal and an output coupled to the input of the first circuitry, the second circuitry operable to determine the current being drawn by the current consuming device based upon the first signal, and to provide the second signal at its output.

10. The device of claim 9, wherein the first circuitry comprises a digital-to-analogue converter.

11. The device of claim 10, wherein the second circuitry comprises:

a first frequency adjustable oscillator operable to provide an output signal having a pulse-width based on an amount of time the current consuming device is in the "OFF" phase; and a counter comprising a first input coupled to the output of the first frequency adjustable oscillator and an output coupled to the input of the digital-to-analogue converter.

12. The device of claim 11, wherein the second circuitry further comprising:

a second frequency adjustable oscillator comprising an input coupled to the output of the module and an output operable to provide an output signal having a pulse-width based on an amount of time the current consuming device is in the "ON" phase; and wherein the counter comprises a second input coupled to the output of the second frequency adjustable oscillator.

13. The device of claim 8, wherein the output of the comparator is operable to control a lamp driver signal for driving a light emitting current consuming device.

14. The device of claim 13, wherein the second circuitry is operable to determine the current being drawn based on a temperature of the light emitting current consuming device.

15. The device of claim 13, wherein the second circuitry is operable to determine the current being drawn based on a variation in temperature of the light emitting current consuming device.

16. The device of claim 13, wherein the second circuitry comprises an integrator comprising an output operable to provide a signal indicative of a bulb filament temperature, the second circuitry operable to adjust the second signal based on the output of the integrator.

17. The device of claim 16, wherein the integrator is a digital integrator.

18. The device of claim 8, wherein the output of the comparator is operable to control a motor driver signal for driving a light emitting current consuming device.

19. The device of claim 8, wherein the second circuitry is operable to adjust the second signal by continuously monitoring the current being drawn by the current consuming device.

20. The device of claim 8, wherein the second circuitry is operable to adjust the second signal by intermittently monitoring the current being drawn by the current consuming device.

* * * * *